United States Patent
Deng et al.

(10) Patent No.: US 12,136,120 B2
(45) Date of Patent: Nov. 5, 2024

(54) METHOD AND APPARATUS FOR PROVIDING STATE INFORMATION OF TAXI SERVICE ORDER, AND STORAGE MEDIUM

(71) Applicant: BEIJING BAIDU NETCOM SCIENCE TECHNOLOGY CO., LTD., Beijing (CN)

(72) Inventors: Guochuan Deng, Beijing (CN); Yan Jiao, Beijing (CN); Bu Mi, Beijing (CN); Pengcheng Song, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 254 days.

(21) Appl. No.: 17/811,700

(22) Filed: Jul. 11, 2022

(65) Prior Publication Data
US 2022/0343400 A1 Oct. 27, 2022

(30) Foreign Application Priority Data
Jul. 15, 2021 (CN) .......................... 202110801997.0

(51) Int. Cl.
G06Q 30/06 (2023.01)
G06Q 30/0601 (2023.01)
G06Q 50/40 (2024.01)
H04W 4/40 (2018.01)

(52) U.S. Cl.
CPC ......... *G06Q 30/0635* (2013.01); *G06Q 50/40* (2024.01); *H04W 4/40* (2018.02)

(58) Field of Classification Search
USPC ...................................... 705/26.81
See application file for complete search history.

(56) References Cited

U.S. PATENT DOCUMENTS 10,127,496 B1 * 11/2018 Fu .......................... G06N 3/045
10,198,594 B2 * 2/2019 Zhang ................. G06F 21/6245
11,196,835 B2 * 12/2021 Nishimura ............ H04L 51/216
(Continued)

FOREIGN PATENT DOCUMENTS

CN 104615350 A 5/2015
CN 105975224 A 9/2016
(Continued)

OTHER PUBLICATIONS

Lillington, K., "Online: Mobile matters: Text a lift from a cab: Dubliners are pioneering text messaging as a new way to hail a cab," The Guardian, [London (UK)] Jul. 12, 2001: Online. (Year: 2001).*
(Continued)

*Primary Examiner* — Nicholas D Rosen
(74) *Attorney, Agent, or Firm* — Osha Bergman Watanabe & Burton LLP (57) ABSTRACT

Disclosed are a method and an apparatus for providing state information of a taxi service order and a storage medium. The method includes in a case that an electronic device is in a screen-locked state, detecting that the state information corresponding to the taxi service order changes, and acquiring changed state information of the taxi service order and generating voice information corresponding to the changed state information, and broadcasting the voice information through voice.

18 Claims, 5 Drawing Sheets

(56) References Cited

U.S. PATENT DOCUMENTS

| | | | | |
|---|---|---|---|---|
| 11,237,010 | B2* | 2/2022 | Zhang | H04W 4/025 |
| 11,297,030 | B2* | 4/2022 | Oliner | G06F 16/9535 |
| 11,483,677 | B2* | 10/2022 | Fang | H04L 67/52 |
| 11,645,731 | B2* | 5/2023 | McNabb | G06F 21/35 |
| | | | | 705/13 |
| 2012/0130627 | A1* | 5/2012 | Islam | G06Q 10/08 |
| | | | | 701/300 |
| 2016/0192324 | A1* | 6/2016 | Zhang | H04W 12/02 |
| | | | | 455/458 |
| 2018/0198887 | A1* | 7/2018 | Nishimura | H04L 67/306 |
| 2019/0311452 | A1 | 10/2019 | McNabb | |
| 2019/0368887 | A1 | 12/2019 | Zhang et al. | |
| 2020/0380533 | A1* | 12/2020 | Lines | G01C 21/3492 |
| 2021/0258730 | A1* | 8/2021 | Fang | H04L 67/55 |
| 2021/0352039 | A1* | 11/2021 | Oliner | G06F 16/9535 |

FOREIGN PATENT DOCUMENTS

| | | | |
|---|---|---|---|
| CN | 107093326 A | 8/2017 | |
| CN | 108537353 A | 9/2018 | |
| CN | 109788132 A | 5/2019 | |
| CN | 112738197 A | 4/2021 | |

OTHER PUBLICATIONS

Anon., "A look at nifty Marshmallow," Timaru Herald [Timaru] Nov. 12, 2015: 9. (Year: 2015).*

Timmermann, J.E., "Does eWOM Affect Demand for Mobile Device Applications?" Journal of Marketing Development and Competitiveness 10.3: 9-16. North American Business Press. (Dec. 2016). (Year: 2016).*

Anon., "Lenovo bets big on personal computers in India, sees significant headroom for growth," ICT Monitor Worldwide [Amman] Sep. 9, 2019. (Year: 2019).*

European Patent Office, machine translation of Chinese Patent Document CN-105975224-A, invented by Chai Chaoya, translation obtained May 13, 2024. (Year: 2024).*

European Patent Office, machine translation of Chinese Patent Document CN-112738197-A, invented by Du Bobo, translation obtained May 13, 2024. (Year: 2024).*

European Patent Office, machine translation of Chinese Patent Document CN 109788132-A, invented by Qin Pan, translation obtained May 13, 2024. (Year: 2024).*

Extended European Search Report issued for corresponding European patent application 22184241.2, mailed Dec. 12, 2022 (8 pages).

Office Action issued for corresponding Chinese application 202110801997.0, mailed on May 13, 2022 (25 pages).

* cited by examiner

FIG. 8 though voice.

METHOD AND APPARATUS FOR PROVIDING STATE INFORMATION OF TAXI SERVICE ORDER, AND STORAGE MEDIUM

CROSS REFERENCE TO RELATED APPLICATION

This application is based on and claims priority to Chinese Patent Application No. 202110801997.0, filed on Jul. 15, 2021, the entire content of which is hereby incorporated by reference.

TECHNICAL FIELD

The disclosure relates to a field of computer technologies, and specifically to a technical field of artificial intelligence technologies such as human-computer interaction and text-to-speech, and especially to a method and an apparatus for providing state information of a taxi service order, and a storage medium.

BACKGROUND

A user requires to view state information corresponding to a taxi service order on an interaction interface of a taxi service software in response to the taxi service software of an electronic device (such as a smart phone) issuing the taxi service order.

SUMMARY

The disclosure provides a method and an apparatus for providing state information of a taxi service order, and a storage medium.

According to an aspect of the disclosure, a method for providing state information of a taxi service order is provided, and includes: in a case that an electronic device is in a screen-locked state, detecting that the state information corresponding to the taxi service order changes, and acquiring changed state information of the taxi service order; and generating voice information corresponding to the changed state information, and broadcasting the voice information through voice.

According to a second aspect of the disclosure, an apparatus for providing state information of a taxi service order is provided, and includes: at least one processor; and a memory communicatively connected to the at least one processor. The memory is stored with instructions executable by the at least one processor, the instructions are performed by the at least one processor to cause the at least one processor to perform: in a case that an electronic device is in a screen-locked state, detecting that the state information corresponding to the taxi service order changes, and acquiring changed state information of the taxi service order; and generating voice information corresponding to the changed state information, and broadcasting the voice information through voice.

According to a third aspect of the disclosure, a non-transitory computer readable storage medium stored with computer instructions is provided. The computer instructions are configured to perform a method for providing state information of a taxi service order of by a computer. The method comprises: in a case that an electronic device is in a screen-locked state, detecting that the state information corresponding to the taxi service order changes, and acquiring changed state information of the taxi service order; and generating voice information corresponding to the changed state information, and broadcasting the voice information through voice.

It should be understood that the content described in the part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

A method for providing state information of a taxi service order, a device and a storage medium in embodiments of the disclosure are described referring to the accompanying drawings.

Figure 1:
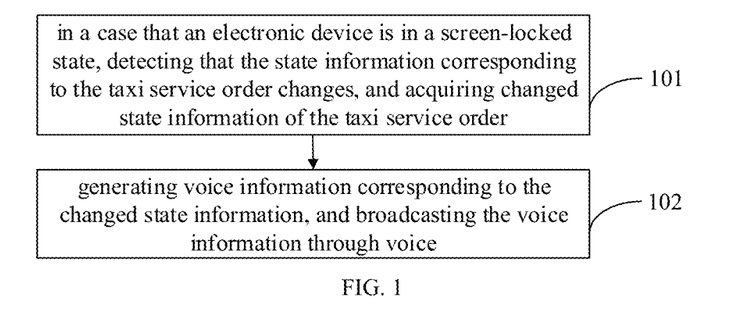
FIG. 1 is a flowchart of a method for providing state information of a taxi service order provided in an embodiment of the disclosure.

FIG. 1 is a flowchart of a method for providing state information of a taxi service order provided in an embodiment of the disclosure.

As illustrated in FIG. 1, the method for providing the state information of the taxi service order may include the following blocks.

At block 101, in a case that an electronic device is in a screen-locked state, it is detected that the state information corresponding to the taxi service order changes, and changed state information of the taxi service order is acquired.

The method for providing the state information of the taxi service order may be executed by an apparatus for providing state information of a taxi service order, and the apparatus for providing the state information of the taxi service order may be implemented by means of a software and/or a hardware and may be configured in an electronic device, and the electronic device may include but not limited to a terminal device (such as a smart phone), which is not specifically limited here.

Specifically, in a case that the electronic device is in the screen-locked state, the state information corresponding to the taxi service order in the electronic device may be detected, to determine whether the state information corresponding to the taxi service order changes. The changed state information of the taxi service order may be acquired in response to the state information corresponding to the taxi service order changing.

The taxi service order may include but not limited to a get-in position and a destination.

At block 102, voice information corresponding to the changed state information is generated, and the voice information is broadcast through voice.

Specifically, voice conversion may be performed on the changed state information to obtain the voice information corresponding to the changed state information.

In the method for providing the state information of the taxi service order in an embodiment of the disclosure, whether the state information corresponding to the taxi service order of the electronic device changes is detected in a case that the electronic device is in the screen-locked state, and the voice information corresponding to the changed state information is broadcast by voice in response to detecting that the voice information changes. Therefore, the changed state information of the taxi service order may be acquired without unlocking the electronic device, and efficiency of message acquiring may be improved.

Figure 2:
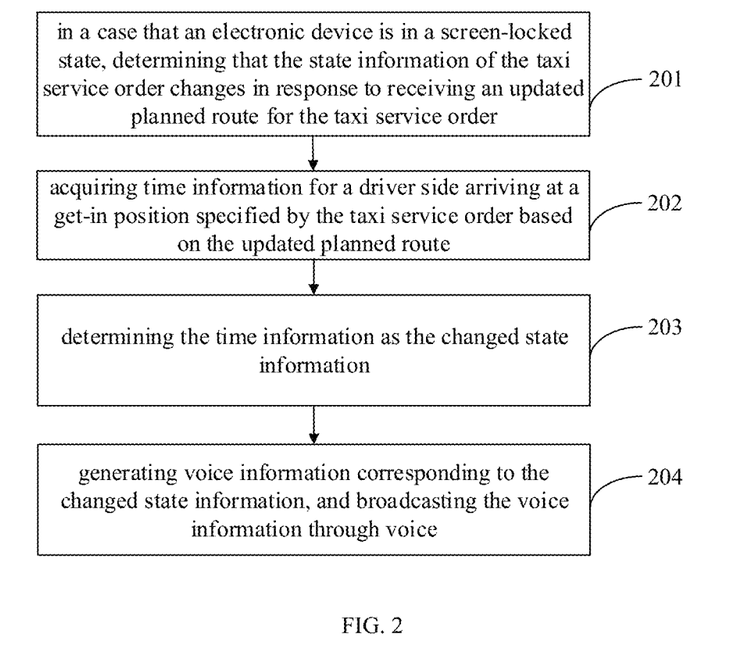
FIG. 2 is a flowchart of a method for providing state information of a taxi service order provided in another embodiment of the disclosure.

FIG. 2 is a flowchart of a method for providing state information of a taxi service order provided in another embodiment of the disclosure.

As illustrated in FIG. 2, the method for providing the state information of the taxi service order may include the following blocks.

At block 201, in a case that an electronic device is in a screen-locked state, it is determined that the state information of the taxi service order changes in response to receiving an updated planned route for the taxi service order.

At block 202, time information for a driver side arriving at a get-in position specified by the taxi service order based on the updated planned route is acquired.

As an example, the time information may be acquired from a taxi service side.

At block 203, the time information is determined as the changed state information.

At block 204, voice information corresponding to the changed state information is generated, and the voice information is broadcast through voice.

In the method for providing the state information of the taxi service order in an embodiment of the disclosure, in a case that the electronic device is in the screen-locked state, in response to detecting that the planned route of the taxi service order is updated, the time information for the driver side arriving at the get-in position specified by the taxi service order based on the updated planned route is acquired and the information is broadcast through voice. Therefore, the changed state information of the taxi service order may be acquired without unlocking the electronic device, and efficiency of message acquiring may be improved.

In some embodiments, a possible implementation of detecting that the state information corresponding to the taxi service order changes, and acquiring the changed state information of the taxi service order may include: in response to receiving a response message of order receiving for the taxi service order, determining that the state information of the taxi service order changes and determining the response message as the changed state information.

In this embodiment, in a case that the electronic device is in the screen-locked state, in response to receiving the response message of order receiving for the taxi service order, it is determined that the state information of the taxi service order changes, the response message of order receiving is determined as the changed state information and the changed state information is broadcast through voice. Therefore, a user may learn that the taxi service order has been received by broadcasting the information through voice without unlocking the electronic device.

The response message of order receiving may include a prompt message configured to prompt that a driver has received the order, and may further include information of a driver side that receives the taxi service order, the time information and distance information for the driver side arriving at the get-in position specified by the taxi service order, etc., which is not specifically limited in the embodiment.

The information of the driver side may include but not limited to license plate number information of the driver side, service scoring information, which is not specifically limited in the embodiment.

In another embodiments, another possible implementation of detecting that the state information corresponding to the taxi service order changes, and acquiring the changed state information of the taxi service order may include: in response to receiving a confirmation instruction of driver arrival for the taxi service order, determining that the state information of the taxi service order changes, acquiring a first prompt message corresponding to the confirmation instruction and determining the first prompt message as the changed state information. Therefore, a user may acquire a message indicating that a driver has arrived by broadcasting the information through voice without unlocking the electronic device.

The first prompt message is configured to prompt a user that the driver has arrived at the get-in position. For example, the first prompt message may be information such as "a driver has arrived at a get-in position".

On the basis of the above any embodiment, in some embodiments, in order to facilitate the user to acquire a dialogue message of a driver side, voice information corresponding to the dialogue message is broadcast through voice in response to receiving the dialogue message of the driver side corresponding to the taxi service order.

Specifically, in response to receiving the dialogue message of the driver side corresponding to the taxi service order, voice conversion may be performed on the dialogue message to obtain the voice information corresponding to the dialogue message, and the voice information corresponding to the dialogue message is broadcast through voice. Therefore, the user may acquire the dialogue message sent by the driver side without unlocking the electronic device, it is facilitated for the user to acquire the dialogue message of the driver side, and efficiency of the user acquiring the dialogue message of the driver side may be improved.

Figure 3:
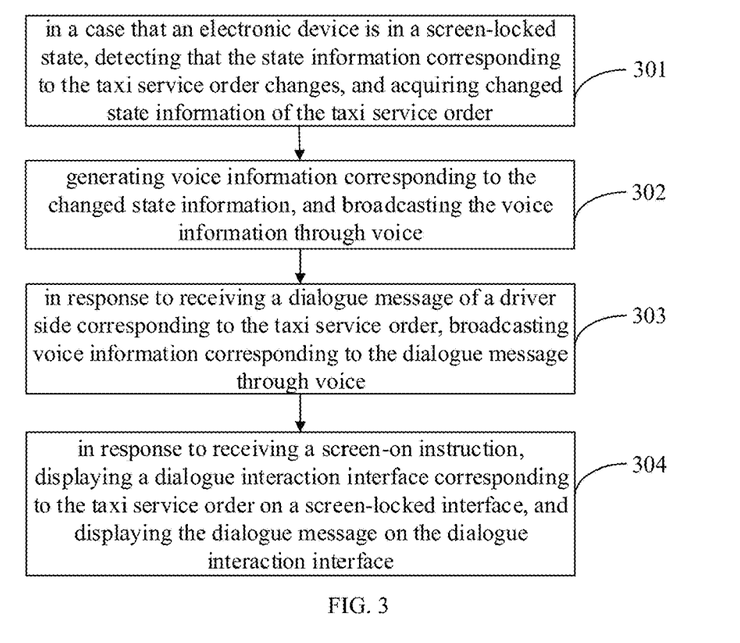
FIG. 3 is a flowchart of a method for providing state information of a taxi service order provided in another embodiment of the disclosure.

FIG. 3 is a flowchart of a method for providing state information of a taxi service order provided in another embodiment of the disclosure.

As illustrated in FIG. 3, the method for providing the state information of the taxi service order may include the following blocks.

At block 301, in a case that an electronic device is in a screen-locked state, it is detected that the state information corresponding to the taxi service order changes, and changed state information of the taxi service order is acquired.

The description of block 301 may refer to relevant descriptions of the above embodiment, which will not be repeated here.

At block 302, voice information corresponding to the changed state information is generated, and the voice information is broadcast through voice.

At block 303, in response to receiving a dialogue message of a driver side corresponding to the taxi service order, voice information corresponding to the dialogue message is broadcast through voice.

At block 304, in response to receiving a screen-on instruction, a dialogue interaction interface corresponding to the taxi service order is displayed on a screen-locked interface, and a dialogue message is displayed on the dialogue interaction interface.

The screen-on instruction may be triggered by a user by triggering a screen-on button in the electronic device.

In an embodiment, in a case that the electronic device is in the screen-locked state, in response to receiving the dialogue message of the driver side corresponding to the taxi service order and the voice information corresponding to the dialogue message is broadcast through voice. Thus, the user may acquire the dialogue message of the driver side by broadcasting the information through voice without unlocking the electronic device. In addition, in response to receiving the screen-on instruction input by the user, the corresponding dialogue interaction interface is displayed on the screen-locked interface of the electronic device, and the dialogue message is viewed on the dialogue interaction. Therefore, the user may further view the dialogue message on the screen-locked interface in response to hearing the dialogue message.

On the basis of the above embodiment, in order to facilitate the user to reply the dialogue message of the driver side, in some embodiments, the dialogue interaction interface further includes an input box and a sending control. The method may further include: acquiring information input into the input box; receiving a trigger instruction for the sending control; and sending the information to the driver side based on the trigger instruction. Therefore, the user may input information into the input box of the dialogue interaction interface and trigger the sending control in the dialogue interaction interface without unlocking the electronic device, such that rapid response to the dialogue message of the driver side may be achieved, which facilitates the user to rapidly reply the dialogue message of the driver side.

Figure 4:
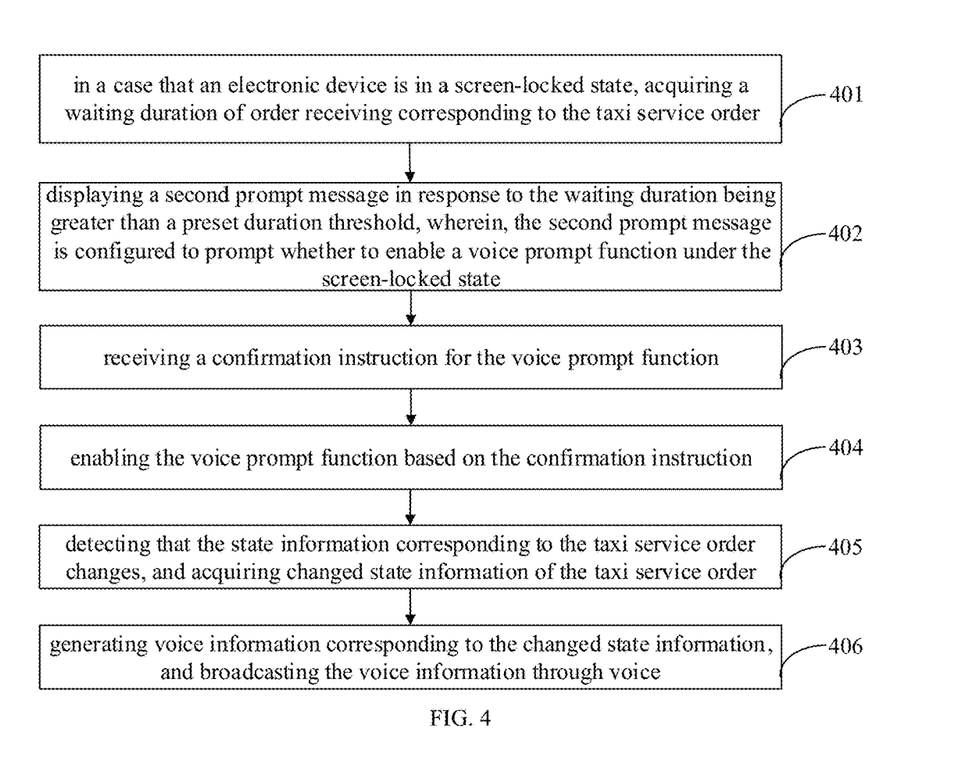
FIG. 4 is a flowchart of a method for providing state information of a taxi service order provided in another embodiment of the disclosure.

FIG. 4 is a flowchart of a method for providing state information of a taxi service order provided in another embodiment of the disclosure.

As illustrated in FIG. 4, the method for providing the state information of the taxi service order may include the following blocks.

At block 401, a waiting duration of order receiving corresponding to the taxi service order is acquired in a case that the electronic device is in a screen-locked state.

As an example, timing may be started in response to the electronic device issuing the taxi service order to a taxi service platform, and the timing may be stop in response to receiving a taxi response result corresponding to the taxi service order. The timing may be continued in response to not receiving the taxi response result corresponding to the taxi service order, to acquire the waiting duration of order receiving corresponding to the taxi service order based on the timing result.

At block 402, a second prompt message is displayed in response to the waiting duration being greater than a preset duration threshold. The second prompt message is configured to prompt whether to enable a voice prompt function under the screen-locked state.

At block 403, a confirmation instruction for the voice prompt function is received.

At block 404, the voice prompt function is enabled based on the confirmation instruction.

At block 405, it is detected that the state information corresponding to the taxi service order changes, and changed state information of the taxi service order is acquired.

The description of block 405 may refer to relevant descriptions of the above embodiment, which will not be repeated here.

At block 406, voice information corresponding to the changed state information is generated, and voice information is broadcast through voice.

In an embodiment, in response to the waiting duration of order receiving corresponding to the taxi service order being greater than the preset duration threshold, it is actively prompted the user whether to enable the voice prompt function under the screen-locked state, and the voice prompt function is enabled based on the confirmation instruction of the user, and the changed state information of the taxi driver order is broadcast through voice in the screen-locked state. Therefore, humanization of the electronic device may be improved, the voice prompt function may be rapidly enabled the user by inputting the confirmation instruction.

Figure 5:
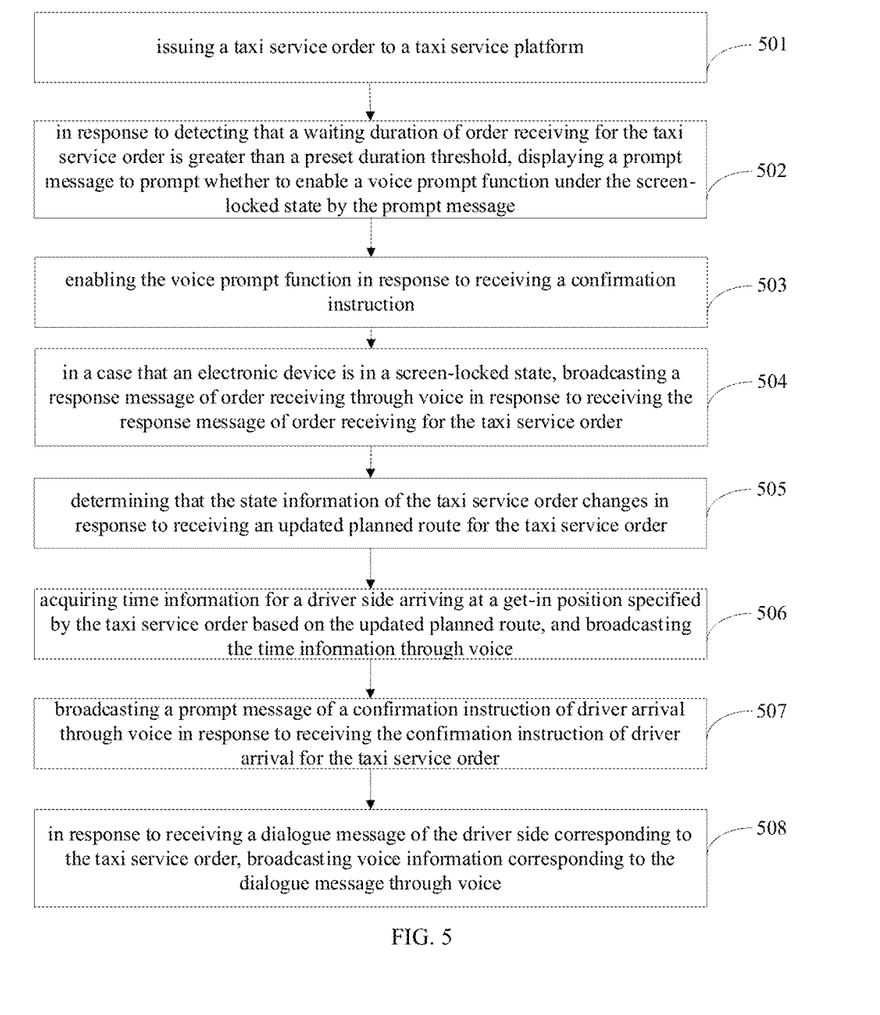
FIG. 5 is a flowchart of a method for providing state information of a taxi service order provided in another embodiment of the disclosure.

In order to make those skilled in the art understand the disclosure clearly, in combination with the method in an embodiment in FIG. 5, as illustrated in FIG. 5, the method may include the following blocks.

At block 501, a taxi service order is issued to a taxi service platform.

At block 502, in response to detecting that a waiting duration of order receiving for the taxi service order is greater than a preset duration threshold, a prompt message is displayed to prompt whether to enable a voice prompt function under the screen-locked state by the prompt message.

At block 503, the voice prompt function is enabled in response to receiving a confirmation instruction.

At block 504, in a case that an electronic device is in a screen-locked state, a response message of order receiving is broadcast through voice in response to receiving the response message of order receiving for the taxi service order.

At block 505, it is determined that the state information of the taxi service order changes in response to receiving an updated planned route for the taxi service order.

At block 506, time information for a driver side arriving at a get-in position specified by the taxi service order based on the updated planned route is acquired, and is broadcast through voice.

It is noted that, in addition to broadcasting the time information through voice, current position information of the driver side may be further acquired and broadcast through voice.

At block 507, a prompt message of a confirmation instruction of driver arrival is broadcast through voice in response to receiving the confirmation instruction of driver arrival for the taxi service order.

The prompt message is configured to prompt that the driver has arrived at the get-in position. At block 508, in response to receiving a dialogue message of the driver side corresponding to the taxi service order, voice information corresponding to the dialogue message is broadcast through voice.

In an embodiment, when the voice prompt function under the screen-locked state is enabled in a process of taking a taxi, the state information of the taxi service order may be broadcast through voice in a case that the electronic device is in the screen-locked state, which may well prompt a user, receive an application feedback in time, and better serve user travelling.

In order to achieve the above embodiment, an apparatus for providing state information of a taxi service order is further provided in an embodiment of the disclosure.

Figure 6:
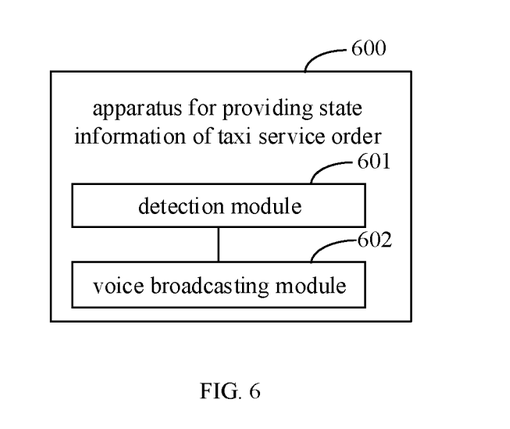
FIG. 6 is a block diagram of an apparatus for providing state information of a taxi service order provided in an embodiment of the disclosure.

FIG. 6 is a block diagram of an apparatus for providing state information of a taxi service order provided in an embodiment of the disclosure.

As illustrated in FIG. 6, the apparatus 600 for providing state information of a taxi service order may include a detection module 601 and a voice broadcasting module 602.

The detection module 601 is configured to, in a case that an electronic device is in a screen-locked state, detect that the state information corresponding to the taxi service order changes, and acquire changed state information of the taxi service order.

The voice broadcasting module 602 is configured to generate voice information corresponding to the changed state information, and broadcast the voice information through voice.

It should be noted that, the foregoing explanation of embodiments of the method for providing the state information of the taxi service order is also applied to this embodiment, which will not be repeated here.

In the apparatus for providing the state information of the taxi service order in an embodiment of the disclosure, whether the state information corresponding to the taxi service order of the electronic device changes is detected in a case that the electronic device is in the screen-locked state, and the voice information corresponding to the changed state information is broadcast by voice in response to detecting that the voice information changes. Therefore, the changed state information of the taxi service order may be acquired without unlocking the electronic device, and efficiency of message acquiring may be improved.

Figure 7:
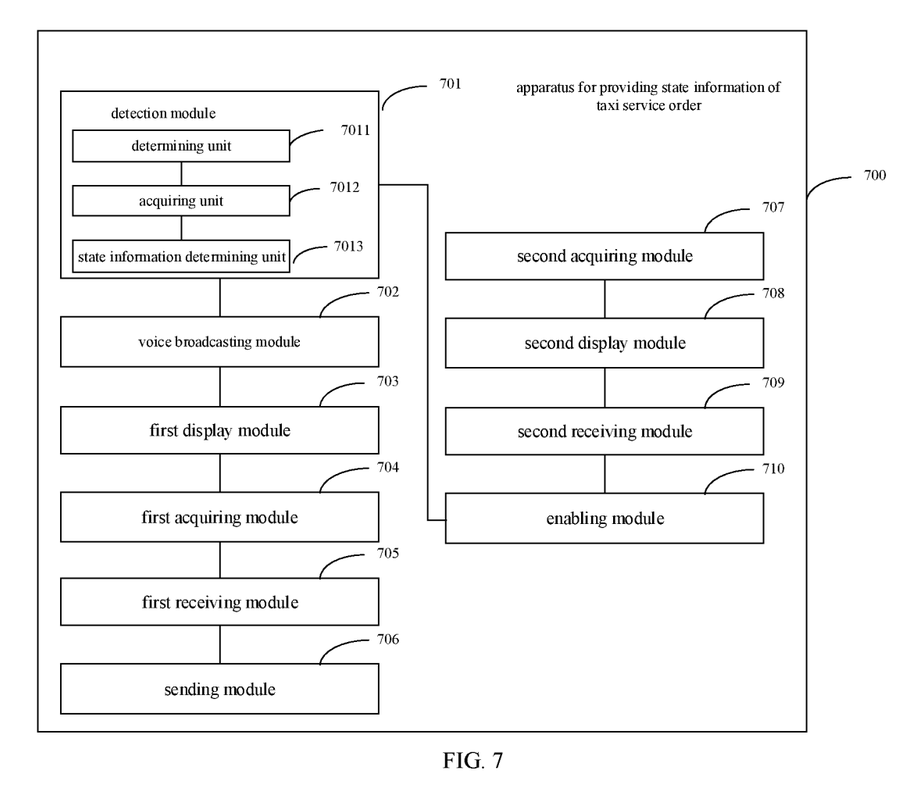
FIG. 7 is a block diagram of an apparatus for providing state information of a taxi service order provided in another embodiment of the disclosure.

In an embodiment of the disclosure, as illustrating in FIG. 7, the apparatus may include a detection module 701 and a voice broadcasting module 702, a first display module 703, a first acquiring module 704, a first receiving module 705, a sending module 706, a second acquiring module 707, a second display module 708, a second receiving module 709 and an enabling module 710. The detection module 701 includes a determining unit 7011, an acquiring unit 7012 and a state information determining unit 7013.

With respect to the detailed description of the voice broadcasting module 702, please refer to the description of the voice broadcasting module 602 in an embodiment as illustrated in FIG. 6, which is not described here.

In an embodiment of the disclosure, as illustrated in FIG. 7, the detection module 701 includes a determining unit 7011, an acquiring unit 7012 and a state information determining unit 7013.

The determining unit 7011 is configured to determine that the state information of the taxi service order changes in response to receiving an updated planned route for the taxi service order; the acquiring unit 7012 is configured to acquire time information for a driver side arriving at a get-in position specified by the taxi service order based on the updated planned route; and the state information determining unit 7013 is configured to determine the time information as the changed state information.

In an embodiment of the disclosure, the detection module 701 is specifically configured to: in response to receiving a response message of order receiving for the taxi service order, determine that the state information of the taxi service order changes and determine the response message as the changed state information; or, in response to receiving a confirmation instruction of driver arrival for the taxi service order, determine that the state information of the taxi service order changes, acquire a first prompt message corresponding to the confirmation instruction and determine the first prompt message as the changed state information.

In an embodiment of the disclosure, the voice broadcasting module 702 is further configured to: in response to receiving a dialogue message of a driver side corresponding to the taxi service order, broadcast voice information corresponding to the dialogue message through voice.

In an embodiment of the disclosure, as illustrated in FIG. 7, the apparatus further includes a first display module 703.

The first display module 703 is configured to in response to receiving a screen-on instruction, display a dialogue interaction interface corresponding to the taxi service order on a screen-locked interface, and display the dialogue message on the dialogue interaction interface.

In an embodiment of the disclosure, the dialogue interaction interface further includes an input box and a sending control, and as illustrated in FIG. 7, the apparatus further includes a first acquiring module 704, a first receiving module 705 and a sending module 706.

The first acquiring module 704 is configured to acquire information input into the input box; the first receiving module 705 is configured to receive a trigger instruction for the sending control; and the sending module 706 is configured to send the information to the driver side based on the trigger instruction.

In an embodiment of the disclosure, as illustrated in FIG. 7, the apparatus further includes a second acquiring module 707, a second display module 708, a second receiving module 709, and an enabling module 710.

The second acquiring module 707 is configured to acquire a waiting duration of order receiving corresponding to the taxi service order; the second display module 708 is configured to display a second prompt message in response to the waiting duration being greater than a preset duration threshold, the second prompt message is configured to prompt whether to enable a voice prompt function under the screen-locked state; the second receiving module 709 is configured to receive a confirmation instruction for the voice prompt function; and the enabling module 710 is configured to enable the voice prompt function based on the confirmation instruction.

It needs to be noted that the foregoing explanation of method embodiments for providing the state information of the taxi service order is also applied to the apparatus for providing the state information of the taxi service order in embodiments, which will not be repeated here.

According to embodiments of the disclosure, the disclosure further provides an electronic device, a readable storage medium and a computer program product.

Figure 8:
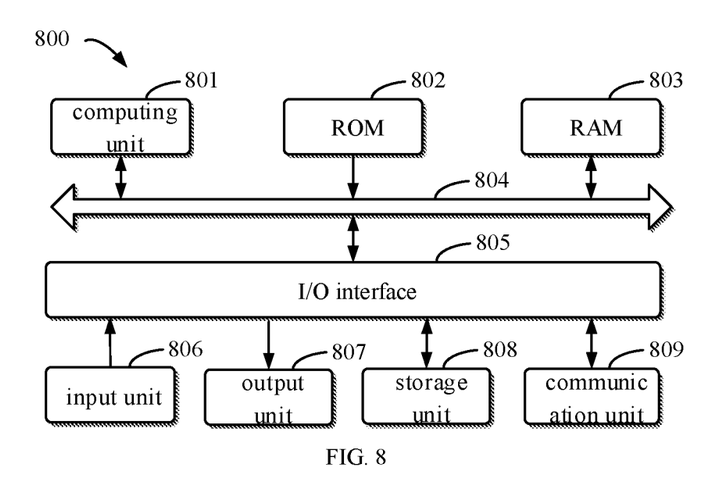
FIG. 8 is a block diagram of an electronic device configured to achieve a method for providing state information of a taxi service order in embodiments of the disclosure.

FIG. 8 illustrates a schematic block diagram of an example electronic device 800 configured to implement the embodiment of the disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 8, a device 800 includes a computing unit 801, configured to execute various appropriate actions and processes according to a computer program stored in a read-only memory (ROM) 802 or loaded from a storage unit 808 to a random access memory (RAM) 803. In a RAM 803, various programs and data required for a device 800 may be stored. A computing unit 801, a ROM 802 and a ROM 803 may be connected with each other by a bus 804. An input/output (I/O) interface 805 is also connected to a bus 804.

A plurality of components in the device 800 are connected to an I/O interface 805, and includes: an input unit 806, for example, a keyboard, a mouse, etc.; an output unit 807, for example various types of displays, speakers; a memory unit 808, for example a magnetic disk, an optical disk; and a communication unit 809, for example, a network card, a modem, a wireless transceiver. The communication unit 809 allows a device 800 to exchange information/data through a computer network such as internet and/or various types of telecommunication networks and other devices.

The computing unit 801 may be various types of general and/or dedicated processing components with processing and computing ability. Some examples of a computing unit 801 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 801 performs various methods and processings as described above, for example, a method for providing state information of the taxi service order. For example, in some embodiments, the method for method for providing state information of the taxi service order may be further implemented as a computer software program, which is physically contained in a machine readable medium, such as a storage unit 808. In some embodiments, a part or all of the computer program may be loaded and/or installed on the device 800 via a ROM 802 and/or a communication unit 809. When the computer program is loaded on a RAM 803 and executed by a computing unit 801, one or more blocks in the above method for providing state information of the taxi service order may be performed. Alternatively, in other embodiments, a computing unit 801 may be configured to execute a method for providing state information of the taxi service order in other appropriate ways (for example, by virtue of a firmware).

Various implementation modes of the systems and technologies described above may be achieved in a digital electronic circuit system, a field programmable gate array (FPGA), an application-specific integrated circuit (ASIC), an application specific standard product (ASSP), a system-on-chip (SOC) system, a complex programmable logic device, a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of a plurality of programming languages. The programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine-readable medium may be a machine-readable signal medium or a machine readable storage medium. A machine-readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components.

The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relationship between the client and the server is generated by computer programs running on the corresponding computer and having a client-server relationship with each other. A server may be a cloud server, also known as a cloud computing server or a cloud host, is a host product in a cloud computing service system, to solve the shortcomings of large management difficulty and weak business expansibility existed in the conventional physical host and Virtual Private Server (VPS) service. A server may be a cloud server, and further may be a server of a distributed system, or a server in combination with a blockchain.

It should be noted that, Artificial intelligence (AI) is a subject that learns simulating certain thinking processes and intelligent behaviors (such as learning, reasoning, thinking, planning, etc.) of human beings by a computer, which covers hardware-level technologies and software-level technologies. AI hardware technologies generally include technologies such as sensors, dedicated AI chips, cloud computing, distributed storage, big data processing, etc.; AI software technologies mainly include computer vision technology, speech recognition technology, natural language processing (NLP) technology and machine learning (ML), deep learning (DL), big data processing technology, knowledge graph (KG) technology, etc.

It should be understood that various forms of procedures shown above may be configured to reorder, add or delete blocks. For example, blocks described in the disclosure may be executed in parallel, sequentially, or in different orders, as long as the desired result of the technical solution disclosed in the present disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of the present disclosure.

What is claimed is:

1. A method for providing state information of a taxi service order, comprising:
   acquiring a waiting duration of order receiving corresponding to the taxi service order;
   displaying a second prompt message in response to the waiting duration being greater than a preset duration threshold, wherein the second prompt message is configured to prompt whether to enable a voice prompt function under a screen-locked state;
   enabling the voice prompt function in response to receiving a confirmation instruction for the voice prompt function;
   in a case that an electronic device is in the screen-locked state, detecting that the state information corresponding to the taxi service order changes, and acquiring changed state information of the taxi service order; and
   generating voice information corresponding to the changed state information, and broadcasting the voice information through voice.

2. The method of claim 1, wherein detecting that the state information corresponding to the taxi service order changes, and acquiring the changed state information of the taxi service order comprises:
   determining that the state information of the taxi service order changes in response to receiving an updated planned route for the taxi service order;
   acquiring time information for a driver side arriving at a get-in position specified by the taxi service order based on the updated planned route; and
   determining the time information as the changed state information.

3. The method of claim 1, wherein detecting that the state information corresponding to the taxi service order changes and acquiring the changed state information of the taxi service order comprises:
   in response to receiving a response message of order receiving for the taxi service order, determining that the state information of the taxi service order changes and determining the response message as the changed state information, or
   in response to receiving a confirmation instruction of driver arrival for the taxi service order, determining that the state information of the taxi service order changes, acquiring a first prompt message corresponding to the confirmation instruction and determining the first prompt message as the changed state information.

4. The method of claim 1, further comprising:
   in response to receiving a dialogue message of a driver side corresponding to the taxi service order, broadcasting voice information corresponding to the dialogue message through voice.

5. The method of claim 4, further comprising:
   in response to receiving a screen-on instruction, displaying a dialogue interaction interface corresponding to the taxi service order on a screen-locked interface, and displaying the dialogue message on the dialogue interaction interface.

6. The method of claim 5, wherein the dialogue interaction interface comprises an input box and a sending control, the method further comprises:
   acquiring information input into the input box; and
   sending the information to the driver side in response to receiving a trigger instruction for the sending control.

7. An apparatus for providing state information of a taxi service order, comprising:
   at least one processor; and
   a memory communicatively connected to the at least one processor, wherein
   the memory is stored with instructions executable by the at least one processor, the instructions are performed by the at least one processor to cause the at least one processor to:
     acquire a waiting duration of order receiving corresponding to the taxi service order;
     display a second prompt message in response to the waiting duration being greater than a preset duration threshold, wherein the second prompt message is configured to prompt whether to enable a voice prompt function under a screen-locked state;
     enable the voice prompt function in response to receiving a confirmation instruction for the voice prompt function;

in a case that an electronic device is in the screen-locked state, detect that the state information corresponding to the taxi service order changes, and acquire changed state information of the taxi service order; and generate voice information corresponding to the changed state information, and broadcast the voice information through voice.

8. The apparatus of claim 7, wherein the at least one processor is configured to:
determine that the state information of the taxi service order changes in response to receiving an updated planned route for the taxi service order;
acquire time information for a driver side arriving at a get-in position specified by the taxi service order based on the updated planned route; and
determine the time information as the changed state information.

9. The apparatus of claim 7, wherein the at least one processor is configured to:
in response to receiving a response message of order receiving for the taxi service order, determine that the state information of the taxi service order changes and determine the response message as the changed state information, or
in response to receiving a confirmation instruction of driver arrival for the taxi service order, determine that the state information of the taxi service order changes, acquire a first prompt message corresponding to the confirmation instruction and determine the first prompt message as the changed state information.

10. The apparatus of claim 7, wherein the at least one processor is configured to, in response to receiving a dialogue message of a driver side corresponding to the taxi service order, broadcast voice information corresponding to the dialogue message through voice.

11. The apparatus of claim 10, wherein the at least one processor is configured to:
in response to receiving a screen-on instruction, display a dialogue interaction interface corresponding to the taxi service order on a screen-locked interface, and display the dialogue message on the dialogue interaction interface.

12. The apparatus of claim 11, wherein the dialogue interaction interface further comprises an input box and a sending control, the at least one processor is configured to:
acquire information input into the input box; and
a sending module, configured to send the information to the driver side in response to receiving a trigger instruction for the sending control.

13. A non-transitory computer readable storage medium stored with computer instructions, the computer instructions are configured to perform a method for providing state information of a taxi service order of by a computer, the method comprises:
acquiring a waiting duration of order receiving corresponding to the taxi service order;
displaying a second prompt message in response to the waiting duration being greater than a preset duration threshold, wherein the second prompt message is configured to prompt whether to enable a voice prompt function under a screen-locked state;
enabling the voice prompt function in response to receiving a confirmation instruction for the voice prompt function;
in a case that an electronic device is in the screen-locked state, detecting that the state information corresponding to the taxi service order changes, and acquiring changed state information of the taxi service order; and
generating voice information corresponding to the changed state information, and broadcasting the voice information through voice.

14. The storage medium of claim 13, wherein detecting that the state information corresponding to the taxi service order changes, and acquiring the changed state information of the taxi service order comprises:
determining that the state information of the taxi service order changes in response to receiving an updated planned route for the taxi service order;
acquiring time information for a driver side arriving at a get-in position specified by the taxi service order based on the updated planned route; and
determining the time information as the changed state information.

15. The storage medium of claim 13, wherein detecting that the state information corresponding to the taxi service order changes and acquiring the changed state information of the taxi service order comprises:
in response to receiving a response message of order receiving for the taxi service order, determining that the state information of the taxi service order changes and determining the response message as the changed state information, or
in response to receiving a confirmation instruction of driver arrival for the taxi service order, determining that the state information of the taxi service order changes, acquiring a first prompt message corresponding to the confirmation instruction and determining the first prompt message as the changed state information.

16. The storage medium of claim 13, wherein the method further comprises:
in response to receiving a dialogue message of a driver side corresponding to the taxi service order, broadcasting voice information corresponding to the dialogue message through voice.

17. The storage medium of claim 16, wherein the method further comprises:
in response to receiving a screen-on instruction, displaying a dialogue interaction interface corresponding to the taxi service order on a screen-locked interface, and displaying the dialogue message on the dialogue interaction interface.

18. The storage medium of claim 17, wherein the dialogue interaction interface comprises an input box and a sending control, the method further comprises:
acquiring information input into the input box; and
sending the information to the driver side in response to receiving a trigger instruction for the sending control.

* * * * *